(12) United States Patent
Rosendahl

(10) Patent No.: US 7,114,538 B2
(45) Date of Patent: Oct. 3, 2006

(54) BASE PLATE FOR MOUNTNG A ROUTER IN A SUPPORT TABLE

(76) Inventor: Dean Robert Rosendahl, 1044 Charleswood Road, Winnipeg, Manitoba (CA) R3R 3X2

(*) Notice: Subject to any disclaimer, the term of this patent is extended or adjusted under 35 U.S.C. 154(b) by 0 days.

(21) Appl. No.: 11/159,416

(22) Filed: Jun. 23, 2005

(65) Prior Publication Data

US 2005/0279424 A1 Dec. 22, 2005

Related U.S. Application Data

(63) Continuation-in-part of application No. 10/628,572, filed on Jul. 29, 2003, now Pat. No. 6,997,222.

(51) Int. Cl.
*B27C 5/10* (2006.01)

(52) U.S. Cl. ............................ 144/136.95; 144/252.1; 409/182; 409/137; 408/67

(58) Field of Classification Search ........... 144/136.95, 144/154.5, 252.1, 252.2, 286.5, 286.1; 409/180–182, 409/137; 408/67; 83/100; 451/456

See application file for complete search history.

(56) References Cited

U.S. PATENT DOCUMENTS

| | | | | |
|---|---|---|---|---|
| 4,088,164 A | * | 5/1978 | McCord, Jr. | ............... 144/252.1 |
| 4,738,571 A | * | 4/1988 | Olson et al. | ................. 409/137 |
| 4,821,365 A | * | 4/1989 | Charters | ....................... 15/339 |
| 5,509,454 A | * | 4/1996 | Giacometti | ............... 144/252.1 |
| 5,611,378 A | * | 3/1997 | Brazell | ..................... 144/135.2 |
| 5,678,965 A | | 10/1997 | Strick | |
| 5,993,124 A | * | 11/1999 | Cooper et al. | ............... 409/137 |
| 6,305,447 B1 | | 10/2001 | Rousseau | |
| 6,382,276 B1 | | 5/2002 | Daniels et al. | |
| 6,520,224 B1 | | 2/2003 | Smith | |
| 2004/0182476 A1 | * | 9/2004 | Karkosch et al. | ....... 144/136.95 |

* cited by examiner

*Primary Examiner*—Derris H. Banks
*Assistant Examiner*—Shelley Self
(74) *Attorney, Agent, or Firm*—Adrian D. Battison; Michael R. Williams; Ryan W. Dupuis

(57) ABSTRACT

A system of machining a workpiece with a router bit includes a base plate for mounting in a recess in a router table having a work surface over which the workpiece is to be moved. The router is mounted underneath the plate with the bit projecting through a bit opening. Two suction openings through the base plate to the work surface are connected to a common suction duct with the openings being spaced from the bit opening so as to draw material from the bit over the work surface along the workpiece. The end plate of the router is attached to the base plate by a plurality of rotatable disks each having a slot for receiving a fastening screw. When using a centering system, the holes in the end plate can be aligned with the respective slot in the respective disk and the router clamped in place at a centered location.

21 Claims, 7 Drawing Sheets

BASE PLATE FOR MOUNTNG A ROUTER IN A SUPPORT TABLE

This application is a continuation-in-part application of application Ser. No. 10/628,572 filed Jul. 29th 2003 and now issued to U.S. Pat. No. 6,997,222.

This invention relates to base plate for mounting a router in a support table.

BACKGROUND OF THE INVENTION

Routers have become a popular tool in woodworking due to the flexibility of the tool allowing it to carry out a number of different functions. This flexibility has been particularly enhanced by providing a router table with an upper surface on which the workpiece can be located and moved so as to move relative to the fixed router and the router bit which projects through the surface.

Routers therefore are commonly used with a router table and in many cases the router table includes an insert plate which is bolted onto the end plate of the router so that the drive shaft of the router projects through an opening in the plate to the router bit which is presented wholly or partly above the surface to act upon the workpiece. Different arrangements of bits can be used for different functions.

In some cases the router is used to cut a groove in the under surface of the workpiece with the groove being shaped in dependence upon the shape of the bit for various different arrangements and uses.

In other functions, the bit is used to cut or shape an edge of the workpiece. In this case the workpiece can be guided by a fence mounted on the table at the bit. Other arrangements of guide fence are well known to one skilled in the art for co-operation with various guide elements which can be attached to the workpiece or to the table.

Routers can also be used as hand held or manual tools where the workpiece is clamped to the table and the router bit moved over the workpiece. The bit axis is maintained at right angles to the workpiece surface by providing a router end plate lying in a radial plane of the bit so that the bottom surface of the end plate can slide over the workpiece in contact with the upper surface thereof.

One problem area which remains in such routers, despite many years of development and availability, is that of removing the machined waste material in the form of dust or chips which can be expelled into the air or left as waste material on the table or on the workpiece.

This problem has been sufficiently severe to limit the desirability of this machining method since the material expelled into the air is difficult to control and can be at best unpleasant and at worst environmentally damaging.

Various attempts have therefore been made to extract the dust and particles from the area of the workpiece including overhead suction nozzles which are attached to a suction duct. Such suction nozzles can be adjusted and located at a suitable position so as to attempt to carry away the dust and particles expelled by the bit in an upward direction away from the table. This arrangement is unsatisfactory in that it is unable to collect all of the materials escaping into the air and in that it often leaves materials on the table which interfere with the operation and movement of the workpiece, or it leaves materials on the workpiece which interfere with the movement of the hand held router.

Another arrangement has been provided to generate suction around the bit at the bit opening in the table. This is normally provided by generating a suction duct in the end plate of the router. Thus the end plate around the motor is machined with various walls and dividers in the end plate it is clamped to the underside of the table so as to generate a suction around the bit opening to attempt to extract material which is released at the bit into the end plate of the router and from that end plate into a suction nozzle attached to the router itself. This arrangement has become widely and commonly accepted in the router industry and many routers are currently available with such a suction extraction system. However the system has been revealed to be less than satisfactory leaving many particles on the table and still allowing dust to expel into the air.

Up until now there has been no simple solution to problem of waste material extraction and this remains and has remained a long standing problem.

In an article in the Journal Better Homes and Gardens WOOD of February 1999 Issue No. 33 pages 50 to 56 is shown an arrangement in which a suction duct is communicated to an opening on the router table which is spaced away from the router bit at a position which is intended to be behind the guide fence so that suction across the top of the table surfaces communicated from the suction opening to the router bit between the two sections of the fence by a cover over a top of the table. This arrangement is merely a proposal in a magazine and has not apparently led to any commercial production.

In U.S. Pat. No. 5,611,378 (Brazell) issued Mar. 18, 1997 is disclosed an arrangement in which a suction duct is communicated through a slot in the underside of the table to the area of the bit so as to attempt to remove the particles from the area of the bit. This arrangement is also unsatisfactory.

A further problem with regard to the base plate for an arrangement of this type is that of the attachment of the base plate to the router. Many different styles of router are manufactured by many different companies so that each has an end plate on the router body with a different pattern of fasteners. This makes it very difficult to provide a universal base plate which can be attached to all different types of router in view of the complexity of the different hole patterns.

Some manufacturers overcome this problem by manufacturing a number of different plates each with different hole patterns and each designed to attach to particular routers of particular manufacturers. However this is of course inconvenient and there is a significant risk that the purchaser will obtain the wrong plate for the wrong router leading to frustration.

Some plates are simply manufactured without holes leaving the purchaser to drill holes at the required location. However placing these holes at the required position is extremely difficult to achieve any effective attachment let alone an accurate attachment which locates the hole in the base plate concentric with the axis of the bit.

Attempts to overcome this problem have been put forward by JessEm Tool Company of Ontario Canada in their brochure for the product "Mast R Plate" and "Route R Plate". These arrangements are shown in U.S. Pat. No. 6,520,224 (Smith) issued Feb. 18, 2003. In these arrangements there is provided a mounting plate which has either a large array of holes or has slots which is thus highly perforated together with a cover plate which attaches on top of the mounting plate and forms the top surface for the base plate in the table. This arrangement has been commercially available but has some difficulty in that it requires additional parts with the prospect of increased complication and increased cost.

In U.S. Pat. No. 6,382,276 (Daniels) issued May 7, 2002 the same problem is considered and the solution uses an intervening mounting plate which is again highly perforated with whole arrays of a particular complexity.

U.S. Pat. No. 6,305,447 discloses a further arrangement of base plate which utilizes central rings within a central opening of the base plate so as to define a required diameter of a central opening, depending upon the ring selected.

SUMMARY OF THE INVENTION

It is one object of the invention to provide an improved base plate for mounting a router in a router table.

According to one aspect of the invention there is provided a base plate apparatus for attachment to a router wherein the router has a router motor for rotation of a router bit by the router motor with the router motor being mounted in a router housing with an end plate for attachment to the base plate apparatus, the end plate having a plurality of fastening screw holes at predetermined positions thereon by which the end plate can be fastened by screws at right angles to the end plate and engaging into the screw holes;

the base plate apparatus comprising:

a plate member shaped and arranged to define an upper surface of the plate member with the upper surface arranged for contact with a workpiece;

the plate member being arranged for attachment of the under side of the plate member to the end plate of the router housing;

the plate member having a bit hole therethrough breaking out at a bit opening in the upper surface such that a router bit attached to the router extends through the bit hole through the plate member for engaging a workpiece in contact with the upper surface of the plate member so that the bit cuts a shape into the workpiece;

the upper surface of the plate member being arranged such that movement between of the workpiece over the plate member causes sliding movement between the upper surface of the plate member and the workpiece while the upper surface remains in contact with the workpiece;

the plate member having a plurality of plate holes at spaced positions around the bit hole;

and a fastening system for fastening the end plate of the router housing to the plate member comprising:

a plurality of adjustable members;

each of the adjustable members defining a fastening hole therethrough for receiving a fastening screw for engagement into a fastening hole of the end plate;

each of the adjustable members being shaped and arranged for mounting into a respective plate hole in the plate member such that the adjustable member is supported in the plate member substantially coplanar therewith and with the fastening hole substantially at right angles to the plate member;

each of the adjustable members being adjustable in its respective plate hole relative to the plate member so as to move the fastening hole relative to the plate member so as to match the predetermined positions of the fastening screw holes of a selected router.

The plate member is preferably formed as a single plate such that an underside of the single plate is directly attached to the end plate of the router and the upper side of the plate is arranged for contact with the workpiece. However base pates of this type are known which are formed in two pieces as a sub plate attached to the end plate of the router and a top plate cover plate attached to the sub plate. Thus the arrangement defined above and forming part of this invention may include a plate member formed in two or more pieces.

While the primary use of the base plate is in mounting in a table, the base plate may also be used in hand guiding the router.

One of the most important aspect of the mounting rings defined herein is their ability to mount a router to a base plate so that the router bit is centered for guide work and alike. Guide work is done both in the table mounted position as well as when used by portable hand, with 80% of the usefulness of a router in the table mounted position. But when used for guide work by portable hand it is very important that the bit be centered in the guide.

The majority of base plates that are sold or manufactured are for the purpose of mounting a router in a table, however the present invention can provide the possibility of using a router in both table and portable hand operations with a properly centered guide.

In order to provide an improved attachment of the end plate to the base plate with more accuracy of location, there is preferably provided an optional centering system as a part of the complete system supplied to a customer for locating the bit axis at the center of the bit opening while the adjustable members are adjusted to attach the end plate to the plate.

Preferably the centering system comprises a pin for mounting in the router on the bit axis and an element defining a central hole in the bit opening for matching the pin and preferably the element comprises an insert disk for mounting in the bit opening and having a central bore therein.

While the adjustment of the location of the opening in each adjustable member can be provided in different ways, in the preferred arrangement each of the adjustable members comprises a circular disk which is rotatable in the respective plate hole.

In order to locate each of the adjustable members in the plate each preferably has a peripheral lip which sits on a corresponding lip in the respective plate hole.

Preferably each of the adjustable members has a slot therein which can be rotated around a center of the respective plate hole in order to provide the required adjustment. Thus the angle of the slot around the axis of the plate hole and the position of the screw fastener along the length of the slot provide infinite adjustment within a circle of operation for each adjustable member. The slot is preferably radial.

The number of plate holes is preferably equal to the number of fastening screw holes in the end plate of the router housing since arrangements with two, three and four holes are known.

Preferably there is provided an insert ring for mounting in the bit hole so as to define a first larger diameter formed by the bit hole and a second smaller diameter formed by an inner hole in the insert ring and the plate holes immediately surround the bit hole such that the adjustable members are immediately adjacent the insert ring.

The above arrangement can optionally and for best advantage be combined with a material clearing system in which there is provided a suction hole through the plate for communicating suction from a suction housing on the underside of the plate to a suction opening in the upper surface of the pate, the suction opening being located at a position spaced outwardly from the plate holes and spaced away from the bit hole.

Preferably there are two suction holes each lying on a radial line of the bit axis where the radial lines are substantially at right angles.

Preferably the plate sits on suction housing communicating to the two suction holes.

In use of the two openings, the workpiece can be moved such that the passage is moved from the first suction opening to the second suction opening. The passage is thus formed generally along the cut line of the bit on the workpiece and in some cases it is desirable to select one or other of the openings depending upon the direction of the cutting action which can be varied to form curved or angled cut lines.

The term "end plate" of the router as used herein is not intended to imply or state any particular construction or shape of the member so defined and is merely intended to relate to that end member which defines an end plate of the router for attachment to the table or for sliding over the workpiece.

According to a second aspect of the invention there is provided a base plate apparatus for mounting a router in a receiving opening in a router table, wherein the table has a table top with the receiving opening therein;

and wherein the router has a router motor for rotation of a bit by the router motor with the router motor being mounted in a router housing with an end plate for attachment to the base plate apparatus, the end plate having a plurality of fastening screw holes at predetermined positions thereon by which the end plate can be fastened by screws at right angles to the end plate and engaging into the screw holes;

the base plate apparatus comprising:

a plate shaped and arranged for mounting in the opening in the table such that the plate sits in the opening and defines an upper surface of the plate with the upper surface arranged for contact with a workpiece;

the plate being arranged for attachment of the under side of the plate to the end plate of the router housing;

the plate having a bit hole therethrough breaking out at a bit opening in the upper surface such that a router bit attached to the router extends through the bit hole through the plate for engaging a workpiece in contact with the upper surface of the plate so that the bit cuts a shape into the workpiece;

the upper surface of the plate being arranged such that movement between of the workpiece over the plate causes sliding movement between the upper surface of the plate and the workpiece while the upper surface remains in contact with the workpiece;

a fastening system for fastening the end plate of the router housing to the plate;

a first suction opening at the upper surface of the plate;

a first suction hole extending from the first suction opening at the upper surface of the plate to the under side of the plate opposite to the surface;

the first suction opening being located in the upper surface at a location spaced from the bit opening in the upper surface so that the first suction opening is separated from the bit opening by a portion of the upper surface;

the first suction opening being located in the upper surface at a location spaced outwardly from the fastening system so as to be outward of the end plate of the router housing;

a source of suction underneath the plate connected to the first suction hole in the plate to draw air and the waste material through the first suction opening in the upper surface;

a second suction opening at the upper surface of the plate;

a second suction hole extending from the second suction opening at the upper surface of the plate to the under side of the plate opposite to the surface;

the second suction opening being located in the upper surface at a location spaced from the bit opening in the upper surface so that the second suction opening is separated from the bit opening by a second portion of the upper surface;

the second suction opening being located in the upper surface at a location spaced from the first suction opening in the upper surface so that the second suction opening is separated from the first suction opening by a third portion of the upper surface;

the second suction opening being located in the upper surface at a location spaced outwardly from the fastening system so as to be outward of the end plate of the router housing;

a source of suction underneath the plate connected to the second suction hole in the plate to draw air and the waste material through the second suction opening in the upper surface.

According to a third aspect of the invention there is provided a base plate apparatus for mounting a router in a receiving opening in a router table, wherein the table has a table top with the receiving opening therein;

and wherein the router has a router motor for rotation of a bit by the router motor with the router motor being mounted in a router housing with an end plate for attachment to the base plate apparatus, the end plate having a plurality of fastening screw holes at predetermined positions thereon by which the end plate can be fastened by screws at right angles to the end plate and engaging into the screw holes;

the base plate apparatus comprising:

a plate shaped and arranged for mounting in the opening in the table such that the plate sits in the opening and defines an upper surface of the plate with the upper surface arranged for contact with a workpiece;

the plate being arranged for attachment of the under side of the plate to the end plate of the router housing;

the plate having a bit hole therethrough breaking out at a bit opening in the upper surface such that a router bit attached to the router extends through the bit hole through the plate for engaging a workpiece in contact with the upper surface of the plate so that the bit cuts a shape into the workpiece;

the upper surface of the plate being arranged such that movement between of the workpiece over the plate causes sliding movement between the upper surface of the plate and the workpiece while the upper surface remains in contact with the workpiece;

a fastening system for fastening the end plate of the router housing to the plate;

a suction opening at the upper surface of the plate;

a suction hole extending from the suction opening at the upper surface of the plate to the under side of the plate opposite to the surface;

the suction opening being located in the upper surface at a location spaced from the bit opening in the upper surface so that the suction opening is separated from the bit opening by a portion of the upper surface;

the suction opening being located in the upper surface at a location spaced outwardly from the fastening system so as to be outward of the end plate of the router housing;

the plate being arranged such that when mounted in the table the workpiece can slide while in contact with the upper surface from the bit opening to the suction opening;

a source of suction underneath the plate connected to the suction hole in the plate to draw air and the waste material through the suction opening in the upper surface.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
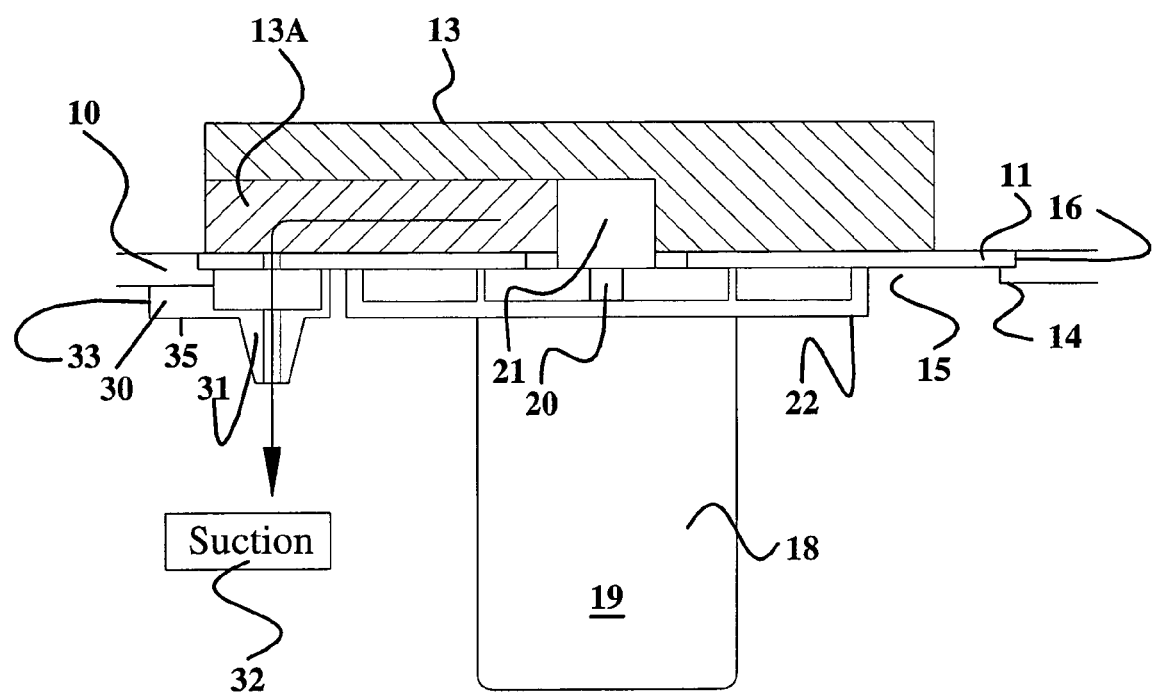
FIG. 1 is a transverse cross sectional view through an embodiment of a combination of router table, base plate and router mounted thereon in which the mounting of the router on the base plate is shown only schematically.
Figure 2:
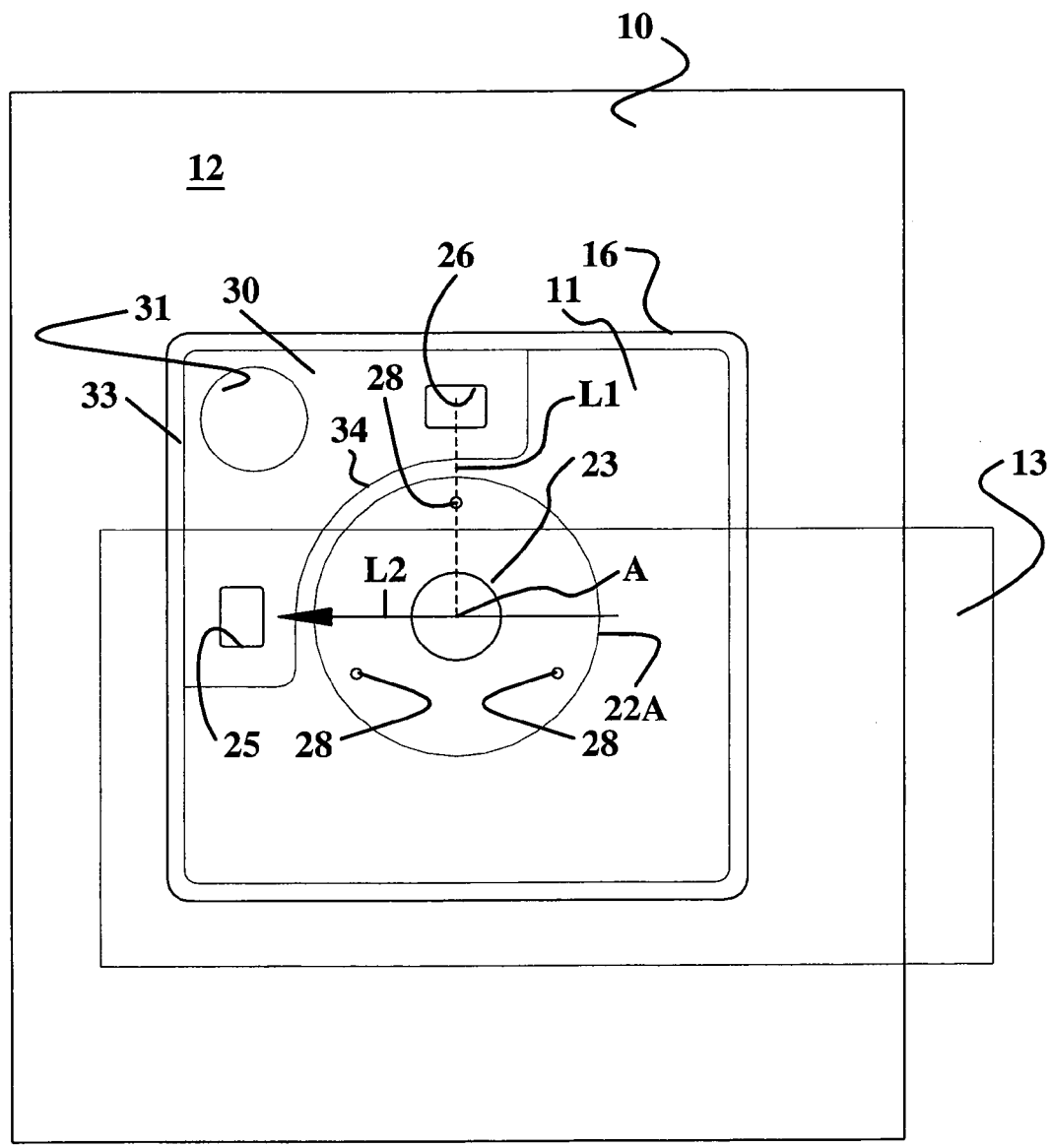
FIG. 2 is a top plan view of the embodiment of FIG. 1.

In the arrangement shown in FIGS. 1 and 2 is provided a router table 10 having an insert plate or base plate 11 so that the table 10 and insert plate 11 define a horizontal upper surface 12 which can receive a workpiece 13. The table is mounted on suitable supports (not shown) and includes suitable clamping arrangements (also not shown) which are well known to one skilled in the art.

The table 10 defines a lip 14 surrounding a rectangular opening 15 over which the plate 11 is mounted so that an edge 16 of the plate sits on the lip 14 allowing the plate to be dropped in place within the opening 15 to provide the upper surface 12 as a substantially flush smooth surface for receiving the workpiece.

A router 18 includes a router motor 19 with a drive shaft 20 and a chuck for containing a bit 21. The motor 19 is attached to an end face plate 22 which is bolted to the underside of the plate 11 by fasteners suitably designed to hold the face plate 22 fixed to the underside of the plate 11. The fasteners are not shown in FIGS. 1 to 3 for convenience of illustration but are shown in more detail in FIGS. 4 to 7 and described hereinafter.

In FIG. 2, the area of the end plate 22 is indicated at the line 22A on the underside of the plate 11. The bit opening in the plate is indicated at 23.

The suction clearing system for clearing waste material in the machining action in the embodiment shown in FIGS. 1 and 2 comprises a pair of suction openings 25 and 26 which extend through the plate in the area of the plate within the periphery 16 of the plate and outside the area 22A of the router. As shown the openings are rectangular but their shape can vary. The openings are located as close as possible to the periphery 22A without interfering with the end face of the router. It will be appreciated that such plates are generally designed to accommodate different sizes and construction of router for different designs of router by different manufacturers and therefore the area 22A may vary for different routers. The location of the openings 25 and 26 is therefore positioned so that it is necessarily outside the largest known or available router construction for which the plate is designed. The plate therefore has mounting openings schematically indicated at 28 which are shaped and designed to accommodate different arrangements of routers.

The openings 25 and 26 are arranged so as to lie on lines L1 and L2 which are at right angles relative to the axis A of the bit. Thus one of the openings 25 is arranged across the table along the line L2 relative to the bit and the other is arranged along the table relative to the length of the table along line L1.

Underneath the plate is mounted a suction housing 30 which connects to an outlet nozzle 31 connected to a source of suction indicated at 32. The housing includes an outer wall 33 at the edge of the plate and a curved wall 34 extending around the area 22A. A bottom plate 35 closes the housing apart from the outlet 31. Thus the suction connected to the outlet nozzle 31 is applied through the housing to both of the openings 25 and 26. The housing may be mounted so that it remains in place in the table allowing the plate 11 to be lifted away and dropped into place on the housing. A sufficient seal is provided between the top of the housing and the underside of the plate to ensure that the suction is adequately communicated through the openings 25 and 25 in the surface of the plate.

In operation as shown in FIG. 1, the work piece indicated at 13 is moved across the router bit 21 so as to form a slot 13A in the workpiece. The user guides the workpiece relative to the bit 21 using known guides or manual operation and at the same time locates the slot 13A defined in the workpiece so that it is positioned over one or other of the openings 25 and 26. This defines a passage extending from the bit to the suction extraction duct 31 so that air is drawn vigorously from the area of the bit through the passage or slot 13A to the suction nozzle thus forming an air stream which carries the material from the bit directly away from the bit to suction. The material cut by the bit tends to be thrown by centrifugal force away from the bit so that the centrifugal force acts to send the material into the passage 13A which assists in the movement towards the remote extraction opening 25 or 26 which is spaced away from the bit rather than located at the bit. The material thus is inhibited from or prevented from escaping into the atmosphere and is also prevented from or inhibited from collecting on the table around the workpiece.

Figure 3:
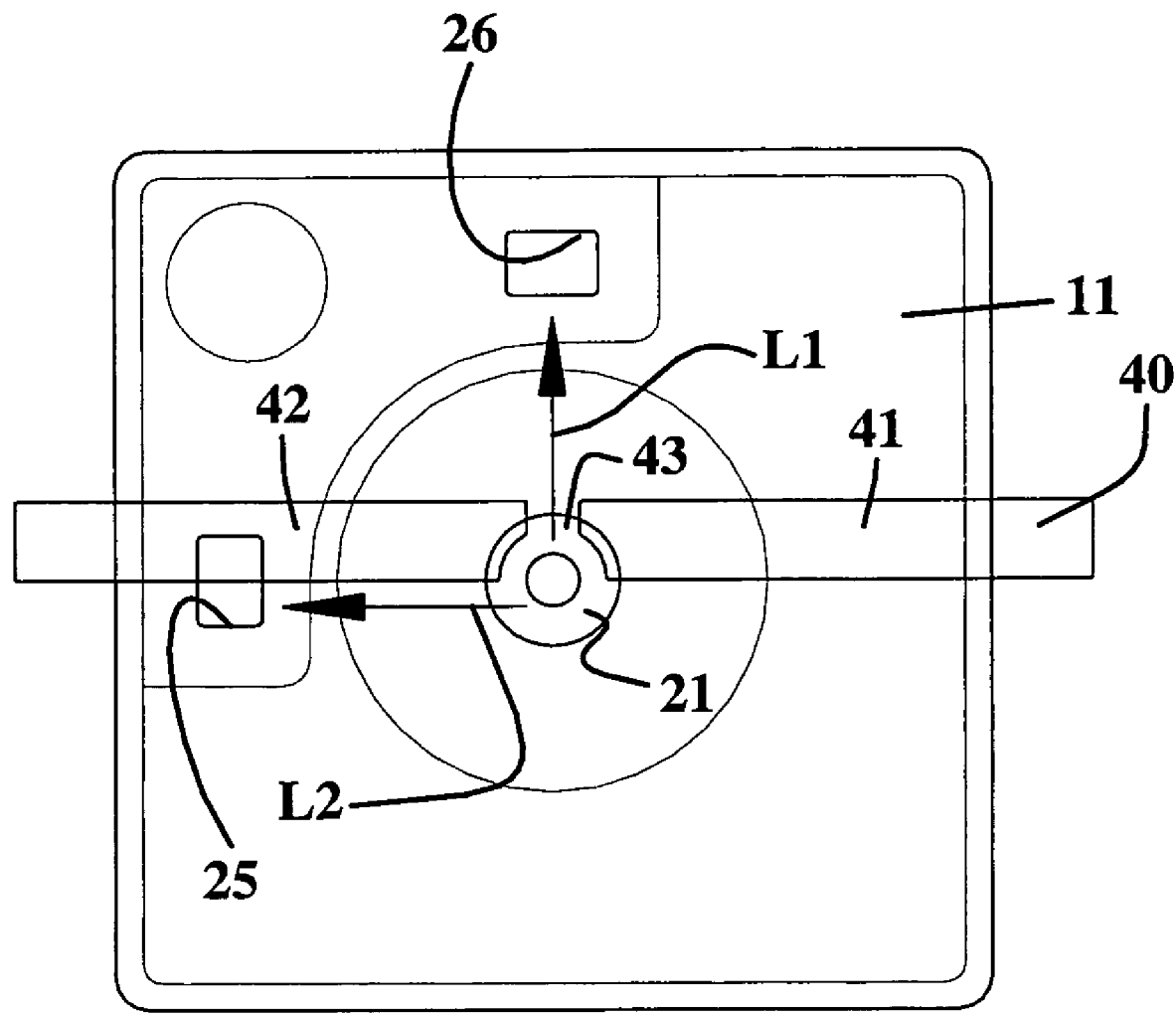
FIG. 3 is a top plan view of the embodiment of FIG. 1 showing the table used with a workpiece guide fence.

In the arrangement shown in FIG. 3, the plate 11 is used in conjunction with a guide fence 40 which is located at the bit 21 and has a space at the bit formed by two sections 41 and 42 of the fence which are separated at an opening 43 at the bit. The opening at the bit is necessary so that the bit can operate on the workpiece on one side of the fence 40.

The fence is aligned with the opening 25 and therefore at right angles to the opening 26 which is spaced behind the fence relative to the bit along the line L2 though the opening 43. Therefore in operation with the workpiece moving along the guide fence 40, a passage is defined along the line L1 from the bit between the fence and the workpiece to the opening 25 along the shape or channel formed in the cutting action of the bit on the workpiece. A second passage is defined through the opening 43 across the plate 11 to the opening 26.

Thus when used with the fence 40 as shown in FIG. 3, the openings 25 and 26 are arranged on radial lines from the axis of the bit which are at right angles. In a situation where the fence is not used, the operator can select one or other of the openings 25 and 26 to generate the passage over the top of the surface of the plate and underneath the groove, channel or shape formed in the workpiece so as to form the passage from the material expelled from the bit to the suction opening.

Thus the positioning of the two section openings within the plate area but arranged at right angles allows the selection of one or other of the suction openings by the operator for convenient use to define the suction passage.

Turning now to the detail of the mounting arrangement for the end plate of the router on the base plate shown in FIGS. 4 through 7, there is provided a mounting system which is supplied in conjunction with the base plate for mounting on a cooperating router.

Thus the system for mounting the router 18 on the plate 11 is generally indicated at 50 and includes a plurality of adjustable mounting members 51, 52, 53 and 54 together with a centering system generally indicated at 55.

It will be appreciated that there are many different manufacturers of routers and many different styles of routers manufactured by those router manufacturers. Thus there is no attempt to standardize the mounting arrangements of the end plate of the router to any particular component. In fact there is probably a tendency for manufacturers to attempt to distinguish their product from others by providing a particular and different mounting arrangement. Some of the routers include two mounting locations, some include three and some include four. Each mounting location generally comprises a threaded hole 56 in the end plate 22 of the router. The hole can be through the end plate or can be a blind hole as chosen by the manufacturer. It is intended that the end plate be attached to a cooperating base plate or other component by a screw fastener 57 which engages through that component and into the threaded hole 56.

In the embodiment shown the mounting system 50 is provided for attachment to a router having four mounting elements each provided by a screw fastener 57 which engages into a respective threaded hole 56.

Figure 6:
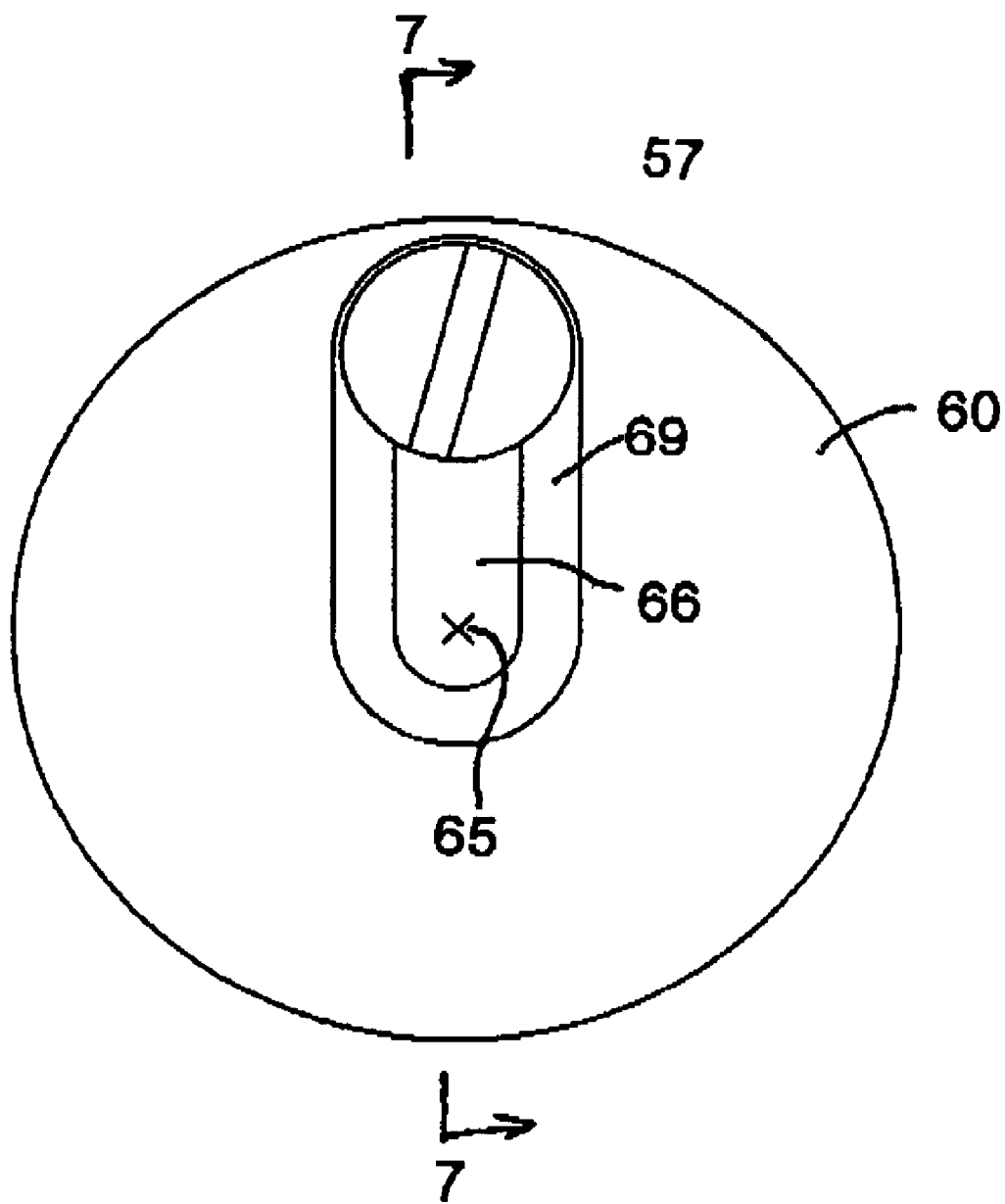
FIG. 6 is a plan view of a single adjustment member of the mounting arrangement shown in FIGS. 4 and 5.
Figure 7:
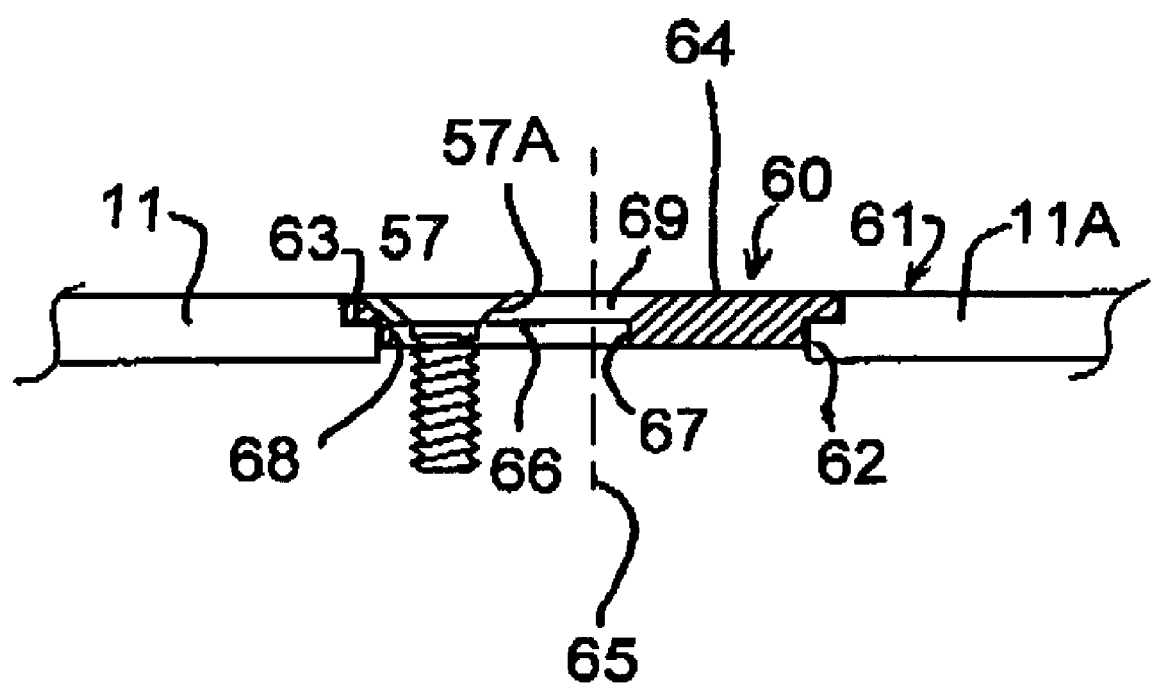
FIG. 7 is a cross sectional view along the lines 7—7 of FIG. 6.

Each of the adjustable mounting members 51 through 54 comprises a disc 60 best shown in FIGS. 6 and 7 which is mounted within a hole 61 in the base plate 11. The hole 61 has a lower lip 62 on which a shoulder 63 of the disc 60 sits. The disc 60 has an upper surface 64 which is contiguous with the upper surface of the base plate 11 as indicated at 11A. The disc is circular so that it can rotate around a disc axis 65 within the hole 61. The disc includes a slot 66 which extends from a first end 67 to a second end 68. The end 67 is just beyond the axis 65 so that a screw fastener can be located at the end 67 of the slot with the axis of the screw fastener approximately at the axis 65. The end 68 is located as close to the outer edge of the disc as possible. Thus the screw fastener indicated at 57 can be moved as required to any position along the length of the slot. The slot cooperates with a chamfered recess 69 surrounding the slot so that a chamfered underside 57A of the screw 57 can be received within the chamfered recess while a body of the screw passes through the slot 66.

It will be appreciated therefore that by rotating the disc 60 around the axis 65 and by moving the screw 57 along the slot 66, the screw can be located at any position within an imaginary circle surrounding the axis 65 and within the end 68 of the slot 66.

The discs 51 through 54 are separate from the base plate. The discs are preferably formed of metal or other similar rigid material so that the discs are more resistant to damage from the screws so as to accommodate repeated attachment and detachment of the router to the base plate.

The base plate is commonly formed from a phenolic resin which has sufficient stiffness to avoid flexing or bowing or sagging within the opening in the table. The resin allows ready sliding movement of the workpiece over the surface of the base plate.

As the upper surface of the discs is flat and contiguous with the upper surface of the base plate, the workpiece can simply slide over the discs without interference from or with the discs.

Figure 4:
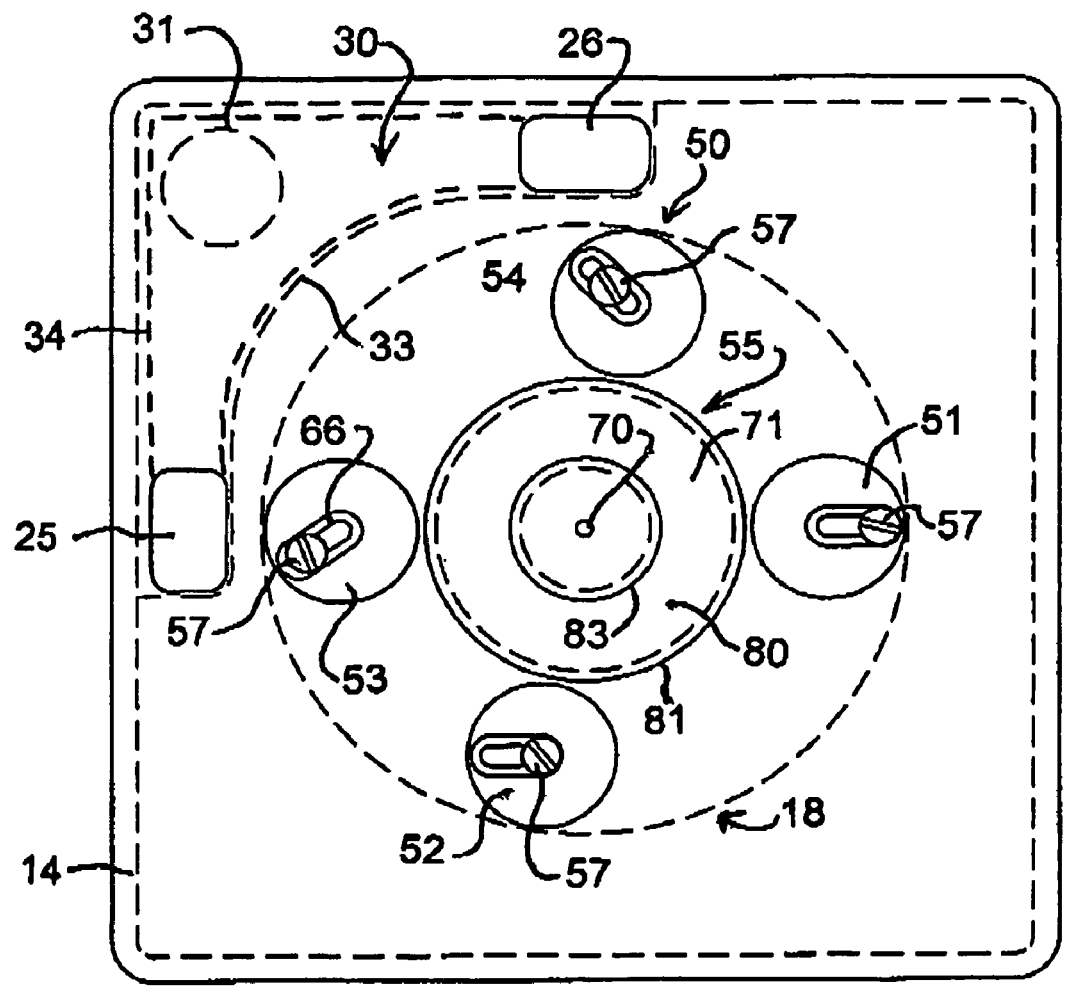
FIG. 4 is a top plan view of the embodiment of FIG. 1 showing the base plate on an enlarged scale and showing the mounting of the base plate on the router in more detail.
Figure 5:
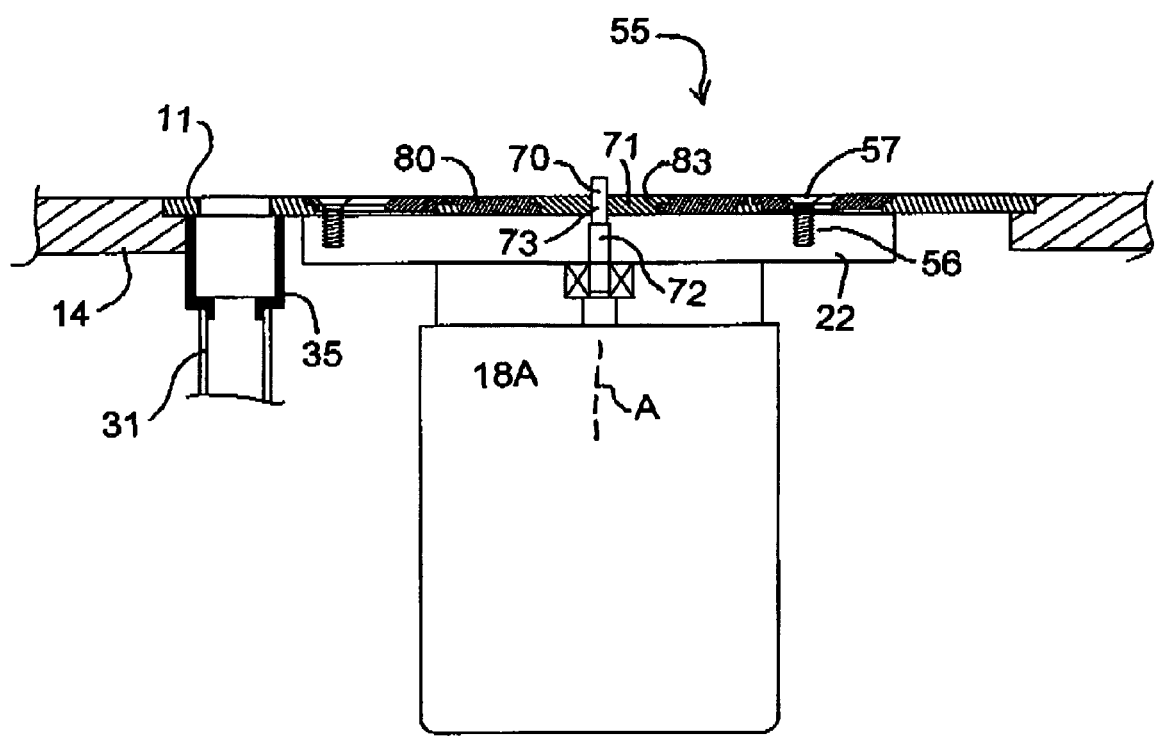
FIG. 5 is a cross sectional view along the lines 5—5 of FIG. 4.

The mounting system 50 defined by the discs cooperates with the centering system 55 shown in FIGS. 4 and 5. The centering system 55 comprises a pin 70 together with a centering disc 71.

As best shown in FIG. 5, the pin 70 forms a part of a bit piece 72 which is inserted within the chuck 18A of the router. Thus the pin 70 is located by the chuck 18A to lie directly on the bit axis A. Thus the axis A is located directly along the axis of the pin 70 in accurate location.

The centering disc 71 is arranged to be mounted in the base plate directly at the center of the base plate. The centering disc 71 has a hole 73 at its center which is matched to the outer diameter of the pin 70. Thus insertion of the pin 70 into the hole 73 accurately locates the router underneath the plate 11 so that the axis A is directly aligned with the center of the plate at the hole 73.

Using the centering arrangement, therefore, the end plate 22 of the router is brought up underneath the base plate with the holes 56 in the end plate located underneath a respective one of the discs 60. With the router accurately centered, the discs 60 are rotated in their respective holes until the hole 56 is visible through the slot 66 allowing the screw fastener 57 to be inserted through the slot 66 into the hole 56.

While the router is held in position up against the backside of the plate and properly centered by the pin 70, the screws 57 can be inserted into each of the fastening holes 56 and then can be snugged down to tighten the router in accurate position centered relative to the center of the base plate and fixed relative to the base plate.

The diameter of the discs is selected relative to known examples of the available routers so as to ensure that the area available to the slots 66 by rotation of the respective disc covers all or substantially all of the available router fastener locations.

In the embodiment shown, the base plate 11 includes a central disc 80 which can be inserted into the base plate at an opening 81. Thus the base plate provides a larger opening 81 defined by removing the disc 80. Thus the large diameter hole 81 allows insertion of a large diameter bit into the chuck 18A. Bits of this larger diameter are well known and widely used for various operations.

When the router is to be used with a smaller size bit again also well known, the ring 80 can be inserted in place within the hole 81 thus defining an inner hole 83 in the ring 80 which surrounds the smaller size bit. The centering disc 71 is shaped to fit within the hole 83 of the ring 80 so that when centering the ring 80 is also used to support the centering disc 71.

It will be noted from FIG. 4 that the discs 60 are located so that their inner edge is immediately adjacent the outer edge of the ring 80 just leaving sufficient material within the base plate between the two elements to provide a structural support at the respective lips supporting the ring 80 and the disc 60. From that inner edge, the disc 60 extends outwardly to the diameter selected in accordance with the calculation of the various locations of the fasteners of available routers. It will be noted that the discs at their outer edges approach closely the wall 33 which defines the inner edge of the housing 30 for the suction duct. In this way careful selection of the geometry of the ring 80, the discs 60 and the housing wall 33 allow the elements to be mounted within the base plate without interference between one and the next.

As an alternative to the discs 60, other arrangements can be provided which can be mounted within the base plate but allow the position of the hole for the screw 57 to be adjusted within an area.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A base plate apparatus for attachment to a router wherein the router has a router motor for rotation of a router bit by the router motor with the router motor being mounted in a router housing with an end plate for attachment to the base plate apparatus, the end plate having a plurality of fastening screw holes at predetermined positions thereon by which the end plate can be fastened by screws at right angles to the end plate and engaging into the screw holes;

the base plate apparatus comprising:
   a plate member shaped and arranged to define an upper surface of the plate member with the upper surface arranged for contact with a workpiece;
   the plate member being arranged for attachment of the under side of the plate member to the end plate of the router housing;
   the plate member having a bit hole therethrough breaking out at a bit opening in the upper surface such that a router bit attached to the router extends through the bit hole through the plate member for engaging a workpiece in contact with the upper surface of the plate member so that the bit cuts a shape into the workpiece;
   the upper surface of the plate member being arranged such that movement between of the workpiece over the plate member causes sliding movement between the upper surface of the plate member and the workpiece while the upper surface remains in contact with the workpiece;
   the plate member having a plurality of plate holes at spaced positions around the bit hole;
   and a fastening system for fastening the end plate of the router housing to the plate member comprising:
   a plurality of adjustable members;
   each of the adjustable members defining a fastening hole therethrough for receiving a fastening screw for engagement into a fastening hole of the end plate;
   each of the adjustable members being shaped and arranged for mounting into a respective plate hole in the plate member such that the adjustable member is supported in the plate member substantially coplanar therewith and with the fastening hole substantially at right angles to the plate member;
   each of the adjustable members being adjustable in its respective plate hole relative to the plate member so as to move the fastening hole relative to the plate member so as to match the predetermined positions of the fastening screw holes of a selected router.

2. The apparatus according to claim 1 wherein there is provided a centering system for locating the bit axis at the center of the bit opening while the adjustable members are adjusted to attach the end plate to the plate member.

3. The apparatus according to claim 2 wherein the centering system comprises a pin for mounting in the router on the bit axis and an element defining a central hole in the bit opening for matching the pin.

4. The apparatus according to claim 3 wherein the element comprises an insert disk for mounting in the bit opening and having a central bore therein.

5. The apparatus according to claim 1 wherein each of the adjustable members comprises a circular disk which is rotatable in the respective plate hole.

6. The apparatus according to claim 1 wherein each of the adjustable members has a peripheral lip which sits on a corresponding lip in the respective plate hole.

7. The apparatus according to claim 1 wherein each of the adjustable members has a slot therein which can be rotated around a center of the respective plate hole.

8. The apparatus according to claim 7 wherein the slot is radial.

9. The apparatus according to claim 1 wherein the number of plate holes is equal to the number of fastening screw holes in the end plate of the router housing.

10. The apparatus according to claim 1 wherein there is provided an insert ring for mounting in the bit hole so as to define a first larger diameter formed by the bit hole and a second smaller diameter formed by an inner hole in the insert ring.

11. The apparatus according to claim 10 wherein the plate holes immediately surround the bit hole such that the adjustable members are immediately adjacent the insert ring.

12. The apparatus according to claim 1 wherein there is provided a suction hole through the plate member for communicating suction from a suction housing on the underside of the plate member to a suction opening in the upper surface of the pate, the suction opening being located at a position spaced outwardly from the plate holes and spaced away from the bit hole.

13. The apparatus according to claim 12 wherein there are two suction holes each lying on a radial line of the bit axis where the radial lines are substantially at right angles.

14. The apparatus according to claim 13 wherein the plate member sits on suction housing communicating to the two suction holes.

15. A base plate apparatus for attachment to a router wherein the router has a router motor for rotation of a bit by the router motor with the router motor being mounted in a router housing with an end plate for attachment to the base plate apparatus, the end plate having a plurality of fastening screw holes at predetermined positions thereon by which the end plate can be fastened by screws at right angles to the end plate and engaging into the screw holes;

the base plate apparatus comprising:
   a plate member shaped and arranged to define an upper surface of the plate member with the upper surface arranged for contact with a workpiece;
   the plate member being arranged for attachment of the under side of the plate member to the end plate of the router housing;
   the plate member having a bit hole therethrough breaking out at a bit opening in the upper surface such that a router bit attached to the router extends through the bit hole through the plate member for engaging a workpiece in contact with the upper surface of the plate member so that the bit cuts a shape into the workpiece;
   the upper surface of the plate member being arranged such that movement between of the workpiece over the plate member causes sliding movement between the upper surface of the plate member and the workpiece while the upper surface remains in contact with the workpiece;
   a fastening system for fastening the end plate of the router housing to the plate member;

a suction opening at the upper surface of the plate member;

a suction hole extending from the suction opening at the upper surface of the plate member to the under side of the plate member opposite to the surface;

the suction opening being located in the upper surface at a location spaced from the bit opening in the upper surface;

the suction opening being separated from the bit opening by the upper surface so that air passing from the bit opening to the suction opening must pass over the upper surface and is prevented from passing through the plate below the upper surface;

the suction opening being located in the upper surface at a location spaced outwardly from the fastening system so as to be outward of the end plate of the router housing;

the plate member being arranged such that the workpiece can slide while in contact with the upper surface from the bit opening to the suction opening;

a source of suction underneath the plate member connected to the suction hole in the plate member to draw air and the waste material through the suction opening in the upper surface.

16. The apparatus according to claim 15 wherein there is provided a second suction opening at the upper surface of the plate member and a second suction hole extending from the suction opening at the upper surface of the plate member to the under side of the plate member opposite to the surface, the second suction opening being located in the upper surface at a location spaced from the suction opening and from the bit opening in the upper surface the second suction opening being separated from the bit opening by the upper surface so that air passing from the bit opening to the second suction opening must pass over the upper surface and is prevented from passing through the plate below the upper surface, and the second suction opening being located in the upper surface at a location spaced outwardly from the fastening system so as to be outward of the end plate of the router housing.

17. The apparatus according to claim 16 wherein the plate member sits on a suction housing communicating to the two suction holes.

18. The apparatus according to claim 16 wherein the second suction opening is arranged substantially on a line radial to the axis of bit which line is at right angles to a radial line from the first suction opening to the axis of the bit.

19. A base plate apparatus for attachment to a router wherein the router has a router motor for rotation of a bit by the router motor with the router motor being mounted in a router housing with an end plate for attachment to the base plate apparatus, the end plate having a plurality of fastening screw holes at predetermined positions thereon by which the end plate can be fastened by screws at right angles to the end plate and engaging into the screw holes;

the base plate apparatus comprising:

a plate member shaped and arranged to define an upper surface of the plate member with the upper surface arranged for contact with a workpiece;

the plate member being arranged for attachment of the under side of the plate member to the end plate of the router housing;

the plate member having a bit hole therethrough breaking out at a bit opening in the upper surface such that a router bit attached to the router extends through the bit hole through the plate member for engaging a workpiece in contact with the upper surface of the plate member so that the bit cuts a shape into the workpiece;

the upper surface of the plate member being arranged such that movement between of the workpiece over the plate member causes sliding movement between the upper surface of the plate member and the workpiece while the upper surface remains in contact with the workpiece;

a fastening system for fastening the end plate of the router housing to the plate member;

a first suction opening at the upper surface of the plate member;

a first suction hole extending from the first suction opening at the upper surface of the plate member to the under side of the plate member opposite to the surface;

the first suction opening being located in the upper surface at a location spaced from the bit opening in the upper surface;

the first suction opening being separated from the bit opening by the upper surface so that air passing from the bit opening to the first suction opening must pass over the upper surface and is prevented from passing through the plate below the upper surface;

the first suction opening being located in the upper surface at a location spaced outwardly from the fastening system so as to be outward of the end plate of the router housing;

a source of suction underneath the plate member connected to the first suction hole in the plate member to draw air and the waste material through the first suction opening in the upper surface;

a second suction opening at the upper surface of the plate member;

a second suction hole extending from the second suction opening at the upper surface of the plate member to the under side of the plate member opposite to the surface;

the second suction opening being located in the upper surface at a location spaced from the bit opening in the upper surface;

the second suction opening being is separated from the bit opening by the upper surface so that air passing from the bit opening to the second suction opening must pass over the upper surface and is prevented from passing through the plate below the upper surface;

the second suction opening being located in the upper surface at a location spaced from the first suction opening in the upper surface so that the second suction opening is separated from the first suction opening by a third portion of the upper surface;

the second suction opening being located in the upper surface at a location spaced outwardly from the fastening system so as to be outward of the end plate of the router housing;

a source of suction underneath the plate member connected to the second suction hole in the plate member to draw air and the waste material through the second suction opening in the upper surface.

20. The apparatus according to claim 19 wherein the plate member sits on a suction housing communicating to the first end second suction holes.

21. The apparatus according to claim 19 wherein the second suction opening is arranged substantially on a line radial to the axis of bit which line is at right angles to a radial line from the first suction opening to the axis of the bit.

* * * * *